United States Patent
Tsuji

(10) Patent No.: US 8,502,871 B2
(45) Date of Patent: Aug. 6, 2013

(54) GAUGE LINE POSITION MEASURING DEVICE, PROGRAM FOR MEASURING A GAUGE LINE POSITION, AND GAUGE LINE MARK

(75) Inventor: Hiroshi Tsuji, Kyoto (JP)

(73) Assignee: Shimadzu Corporation, Kyoto-Shi (JP)

( * ) Notice: Subject to any disclaimer, the term of this patent is extended or adjusted under 35 U.S.C. 154(b) by 1204 days.

(21) Appl. No.: 12/379,393

(22) Filed: Feb. 20, 2009

(65) Prior Publication Data

US 2009/0225167 A1  Sep. 10, 2009

(30) Foreign Application Priority Data

Mar. 10, 2008 (JP) .................................. 2008-059462

(51) Int. Cl.
*H04N 7/18* (2006.01)

(52) U.S. Cl.
USPC ................................ 348/160; 348/92; 348/94

(58) Field of Classification Search
USPC ............................................. 348/160, 92, 94
See application file for complete search history.

(56) References Cited

U.S. PATENT DOCUMENTS

| | | | | |
|---|---|---|---|---|
| 4,027,978 A | * | 6/1977 | Yamamoto et al. | 356/393 |
| 6,412,183 B1 | * | 7/2002 | Uno | 33/203.12 |
| 7,061,628 B2 | * | 6/2006 | Franke et al. | 356/604 |
| 7,860,295 B2 | * | 12/2010 | Donner et al. | 382/141 |
| 8,131,385 B2 | * | 3/2012 | Yuzawa | 700/56 |
| 2005/0066534 A1 | * | 3/2005 | Matsuda | 33/502 |

* cited by examiner

*Primary Examiner* — Lynn Field
*Assistant Examiner* — Lin Liu
(74) *Attorney, Agent, or Firm* — Manabu Kanesaka

(57) ABSTRACT

A gauge line position measuring device measures a position of a gauge line provided on a test piece by a non-contact video method. The measuring device includes a gauge line mark adapted to be provided on the test piece and has the gauge line and a first continuous harmonious color density arranged line-symmetrically with respect to the gauge line, and a video camera for taking an image of the gauge line mark on the test piece and outputting gauge line mark image data. A calculation device calculates a gauge line position based on the gauge line mark image data.

5 Claims, 12 Drawing Sheets

Positions of image elements

Numeric calculation result

Error function

Contrast of a gauge line mark for simultaneously obtaining X and Y

GAUGE LINE POSITION MEASURING DEVICE, PROGRAM FOR MEASURING A GAUGE LINE POSITION, AND GAUGE LINE MARK

BACKGROUND OF THE INVENTION AND RELATED ART STATEMENT

The present invention relates to a gauge line position measuring device, a program for measuring a gauge line position, and a gauge line mark in order to measure the gauge line position in a test piece by a non-contact video method.

Conventionally, when a mechanical load is applied on the test piece by a material testing machine, a gauge line position is optically detected. As a gauge line sticker which is put on a gauge line of the test piece, for the simplest example, a sticker with a linear gauge line mark in a direction orthogonal to a displacement direction of the test piece is known. However, in a mere linear gauge line mark, even if shading data by pixels are integrated in the direction orthogonal to the displacement direction of the test piece, it is well-known that it is impossible to obtain a stable measurement accuracy.

Therefore, currently, by improving the mere linear gauge line mark, when the image data are integrated in a direction orthogonal to the displacement direction of the test piece, an interpolating calculation including a number of pixel pitches is possible (refer to Japanese Unexamined Patent Publication (TOKKAI) No. H11-94719). Specifically, by using an improved gauge line mark wherein a black portion and a white portion are clearly distinguished and integrating the image data in a direction orthogonal to the displacement direction of the test piece, a profile P(x) regarding a coordinate x indicating the position of the test piece is obtained, and the gauge line position is computed from two x coordinate values wherein the profile value intersects to a predetermined threshold.

However, even if the above-mentioned improved gauge line mark is used, the interpolating calculation by the pixel pitches is limited to obtaining a measurement resolution of approximately a few to a few tenth of an interval between image elements. Specifically, since a black-and-white gauge line mark is imaged by a video camera, the measurement resolution could not be improved by conducting the interpolating calculation between the image elements.

Accordingly, an object of the invention is to provide a gauge line position measuring device which can accurately measure a gauge line position in a test piece.

Further objects and advantages of the invention will be apparent from the following description of the invention.

SUMMARY OF THE INVENTION

A gauge line position measuring device according to a first aspect of the invention is a device measuring a gauge line position of a test piece by a non-contact video method. The gauge line position measuring device includes a video camera for imaging a gauge line mark wherein a continuous harmonious color density is provided in such a way as to be symmetrical with respect to the gauge line and outputting gauge line mark image data; and a calculation means for calculating the gauge line position based on the gauge line mark image data.

As for the invention according to a second aspect, in the gauge line position measuring device according to the first aspect, the gauge line mark is printed on a gauge line sticker as an image wherein an achromatic or chromatic colored continuous harmonious distribution is symmetrically provided.

As for the invention according to a third aspect, in the gauge line position measuring device according to the first or second aspect, the above-mentioned calculation means obtains a function f(x) by integrating the gauge line mark image data in a Y-axis direction which is orthogonal to a displacement direction of the gauge line mark when the gauge line mark is displaced in an X-axis direction accompanied by a positional displacement of the gauge line. Correlations between two functions which are preliminarily set orthogonally and the function f(x) are calculated, respectively, and based on a ratio of two obtained calculation results, the gauge line position is calculated.

As for the invention according to a fourth aspect, in the gauge line position measuring device according to the first or second aspect, the calculation means obtains the function f(x) by integrating the gauge line mark image data in the Y-axis direction which is orthogonal to the displacement direction of the gauge line when the gauge line position is displaced in the X-axis direction accompanied by the positional displacement of the gauge line. Also, two X-coordinates, wherein a function value of the function f(x) corresponds to a predetermined threshold, are obtained, and a middle position of two X coordinates is set as the gauge line position.

As for the invention according to a fifth aspect, in the gauge line position measuring device according to the fourth aspect, a mark, wherein a predetermined area of the X-axis direction sandwiching the gauge line has a certain density, is used as the gauge line mark.

As for the invention according to a sixth aspect, in the gauge line position measuring device according to the first or second aspect, the calculation means determines the gauge line position as follows. The first function $f_1(x)$ wherein the X-coordinate is variable is preliminarily calculated as reference data by integrating the gauge line mark image data in the Y-axis direction parallel to the gauge line before a load is acted on the X-axis direction orthogonal to the gauge line of the test piece. The second function $f_2(x)$ wherein the X-coordinate is variable is calculated by integrating the gauge line mark image data in the Y-axis direction at the point wherein the gauge line mark is displaced in the X-axis direction accompanied by a positional displacement of the gauge line when the load is applied on the test piece. The reference symbol τ, wherein a correlation function $R_{12}(\tau)$ between the first function $f_1(x)$ and the second function $f_2(x)$ shows the maximum value, is obtained.

As for the invention according to a seventh aspect, in the gauge line position measuring device according to any one of the first to sixth aspects, when the gauge line is displaced toward the X-axis direction orthogonal to the gauge line and the Y-axis direction parallel to the gauge line when the load is applied on the test piece, the X-coordinate and the Y-coordinate of the test piece are calculated by using the mark including the first density pattern wherein the continuous harmonious color density is continuously distributed in such a way as to be symmetrical with respect to the gauge line of the test piece; and the second density pattern wherein the continuous harmonious color density is continuously distributed in such a way as to be symmetrical with respect to a line perpendicularly passing through a predetermined point on the gauge line of the test piece, as the gauge line mark.

As for the invention according to an eighth aspect, the gauge line mark for detecting the gauge line position of the test piece by the non-contact video method has a symmetrical color density distribution with respect to the gauge line, and a continuous harmonious color density distribution.

As for the invention according to a ninth aspect, the gauge line mark for detecting the gauge line position of the test piece by the non-contact video method includes the first density pattern wherein the continuous harmonious color density is continuously distributed in such a way as to be symmetrical with respect to the gauge line of the test piece; and the second density pattern wherein the continuous harmonious color density is continuously distributed in such a way as to be symmetrical with respect to the line perpendicularly passing through the predetermined point on the gauge line of the test piece.

As for the invention according to a tenth aspect, a program for measuring the gauge line position performs a processing for inputting the gauge line mark image data wherein the continuous harmonious color density is distributed in such a way as to be symmetrical with respect to the gauge line of the test piece; and a calculation processing for calculating the gauge line position based on the above-mentioned image data, by a computer.

According to the present invention, since a continuous harmonious image which is line-symmetric is used as the gauge line mark, a measurement resolution of the gauge line is enhanced as compared to a case using a binary image such as a black and white image and the like.

DETAILED DESCRIPTION OF PREFERRED EMBODIMENTS

Hereunder, embodiments of the present invention will be described with reference to the attached drawings.

First Embodiment

Figure 1:
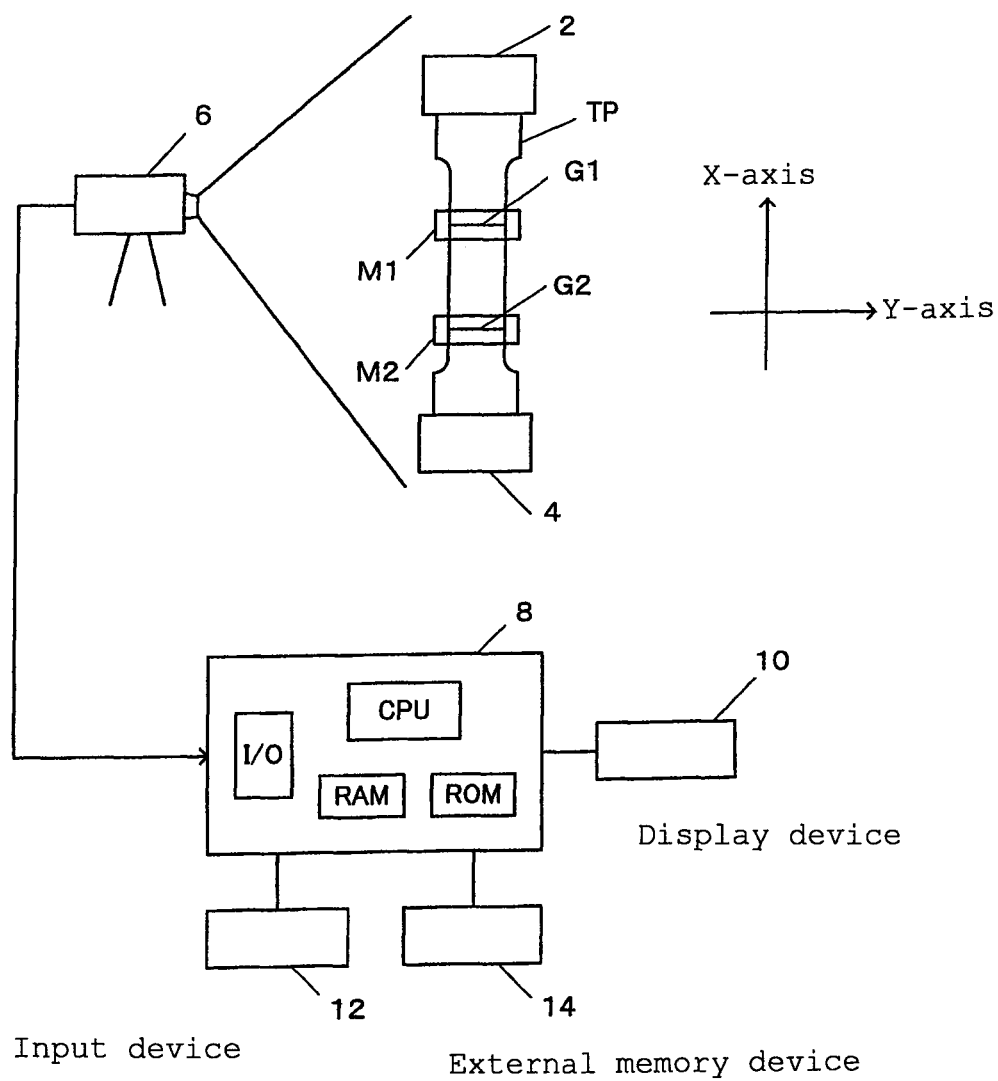
FIG. 1 is an overall structural view of a non-contact video type extensometer wherein the present invention is applied.

FIG. 1 is an overall structural view of a non-contact video type extensometer wherein the present invention is applied. In this drawing, the reference alphabet TP represents a test piece, and is held by an upper clamp tool 2 and a lower clamp tool 4 of a material testing machine (not shown). The reference characters G1, G2 represent gauge lines which are put on the test piece TP. Gauge line stickers are put on the gauge lines G1, G2, and gauge line marks (described hereinafter in detail) are printed on the gauge line stickers. Here, although the gauge line marks are printed on the gauge line stickers, the gauge line marks and the gauge line stickers function as a unit, so that hereinafter, they are simply referred as gauge line marks M1, M2.

Incidentally, the gauge line marks M1, M2 may be put on the test piece TP as a sticker, or formed by discharging or applying ink to the surface of the test piece TP. Also, in FIG. 1, although the gauge lines G1, G2 on the back surfaces of the gauge line marks M1, M2 are shown to be seen therethrough, in reality, only the gauge line marks M1, M2 can be observed.

In this specification, the generic term of the gauge line marks including the gauge line marks M1, M2 is simply called as a gauge line mark M. Also, the generic term of the gauge lines including the gauge lines G1, G2 is simply called as a gauge line G.

The reference numeral 6 represents a video camera, and a lens, zoom ratio or the like of the video camera 6 is set in such a way that at least the gauge line marks M1, M2 are included within the filming view. As described later in detail, the video camera 6 catches the gauge line marks M1, M2, and outputs image data (hereinafter, also called as gauge line mark image data).

The reference numeral 8 represents a computer and includes an interface I/O for taking in the image data, CPU, RAM, ROM for a calculation processing and various controls. A display device 10, an input device 12, and an external memory device 14 are connected to the computer 8. In the ROM of the computer 8, a calculation program for calculating positions of the gauge line marks M1, M2 is stored. The calculation processing will be described hereinafter. Incidentally, the computer 8 functions as a controller of the material testing machine (not shown), so that the computer 8 also includes various interfaces and control circuits (both are not shown) for controlling the material testing machine.

On the right part of FIG. 1, a direction of a coordinate required for measuring the gauge line positions is shown. If a load is applied on the test piece TP, the distance between the gauge lines is stretched, and the direction of the extensional deformation is shown by an X-axis. Specifically, the direction orthogonal to the gauge lines G1, G2 is an X-axis direction. Therefore, the direction parallel to the gauge lines G1, G2 is a Y-axis direction.

When the distance between the gauge lines are measured, positions of two gauge lines G1, G2 are respectively required to be calculated by the CPU. However, methods for calculating the respective positions of the two gauge lines G1, G2 are the same, so that the process of calculating one of the gauge line positions will be explained hereinafter.

Figure 2:
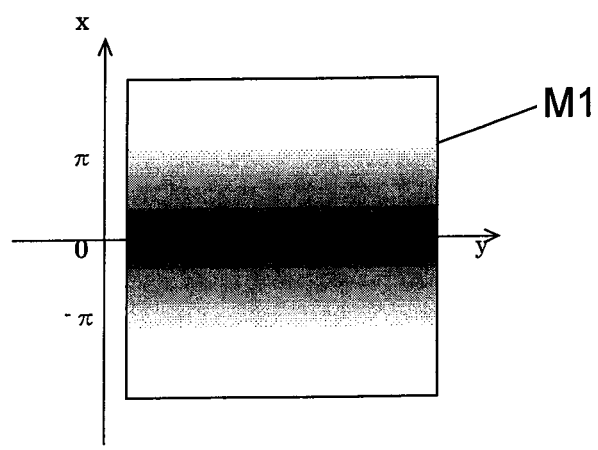
FIG. 2 is an enlarged view of gauge line marks M1, M2.

FIG. 2 is an enlarged view of the gauge line mark M1. As shown in the drawing, an X coordinate before the gauge line G1 is displaced (when the load does not act on the test piece TP) is set at 0. In the gauge line mark M1, a continuous black color density distribution is printed in such a way that the upper side and lower side are symmetrical within a range of $\pm\pi$ sandwiching the X coordinate=0. Specifically, a gray scale wherein the upper part and lower part are symmetrical is illustrated within the range of the X coordinate=$\pm\pi$. The axis for symmetry thereof corresponds to the gauge line G1. More concretely, the black color density of the X coordinate=0 is 1 (100%), and a continuous harmonious density distribution is illustrated in such a way that the black color density of the X coordinate=±π is 0 (0%). Areas wherein the X coordinate exceeds ±π are shown with white (black color density 0).

The length of the crosswise direction (Y-axis direction) of the gauge line mark M1 shown in FIG. 2 has a length suitable for integrating the gauge line mark image data which was obtained by taking an image by the video camera 6 in the Y-axis direction. Also, the black color density in the X-axis direction is set in, for example, tones expressed by eight bits (=256 tones).

In the embodiment, the black color density in the X-axis direction includes a shading distribution expressed in the following formula 1.

$$e(x) = \begin{cases} \frac{1}{2}(1+\cos x) & (-\pi \leq x \leq \pi) \\ 0 & (x < -\pi, \pi < x) \end{cases} \quad \text{[Formula 1]}$$

Figure 3A:
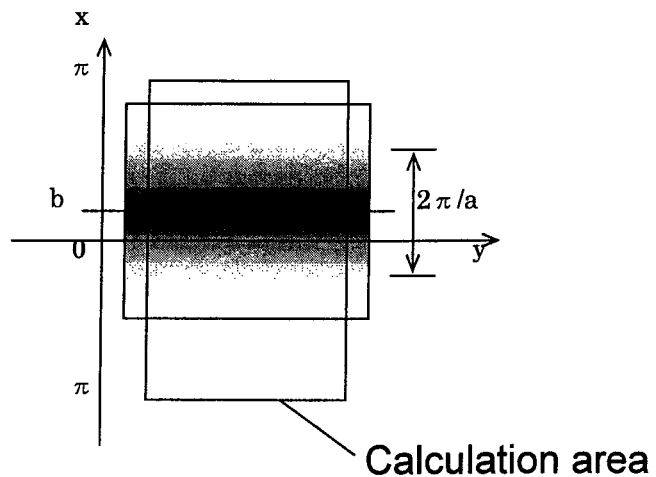
FIGS. 3(A), 3(B) are explanatory drawings when the gauge line marks M1, M2 are displaced.
Figure 3:
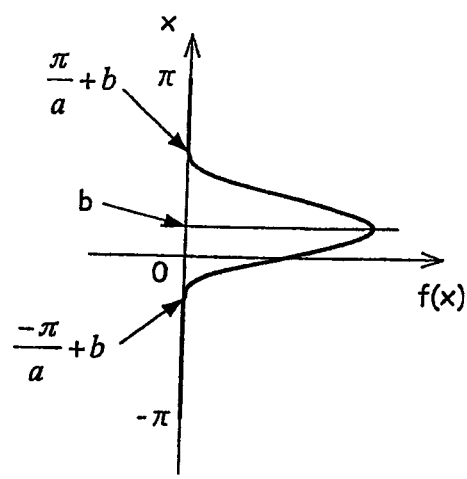

For the sake of explanation, when the load is applied on the test piece TP, the gauge line mark M1 is displaced in a plus direction of the X-axis. FIG. 3(A) shows the above-mentioned state.

FIG. 3(A) shows a calculation area when the position of the displacement gauge line mark M1 and the gauge line mark image data are integrated in the Y-axis direction. The reference character b shown in FIG. 3(A) represents the X coordinate of the displacement gauge line G1, and also shows the position of the axis of symmetry in the gray scale wherein the upper part and lower part are symmetrical.

In the position of the gauge line mark M1 shown in FIG. 3(A), if the gauge line mark image data obtained by the video camera 6 is integrated in the Y-axis direction (the calculation area is −π to +π) by the computer 8, a function f(x) shown in FIG. 3(B) is calculated.

$$f(x) = 2e\{a(x-b)\} \quad \text{[Formula 2]}$$

$$= \begin{cases} 1+\cos a(x-b) & \left(\frac{-\pi}{a}+b \leq x \leq \frac{\pi}{a}+b\right) \\ 0 & \left(x < \frac{-\pi}{a}+b, \frac{\pi}{a}+b < x\right) \end{cases}$$

Here, the reference character a represents an invariable related to the size of the gauge line mark defined by a diameter of an optical system, distance between the camera and the gauge line mark M1, and the like. The reference character b represents a position of the center of gravity of the gauge line mark inside the calculation area (±π) as shown in FIG. 3(B).

Based on the above-mentioned premise, a calculation principle in the present embodiment will be explained.

First, based on the following formula 3, a correlation of the above-mentioned function f(x) and cos x is calculated, and a calculation result is defined as an x correlation. At the same time, a correlation of the function f(x) and sin x is calculated, and a calculation result is defined as a y correlation. Here, the cos x and sin x are descriptively used since they are orthogonal functions. Also, symbol = shown in the formula 3 indicates that the results calculated in the right side equal to the left side.

$$\begin{cases} x = \int_{-\pi}^{\pi} f(x)\cos x\, dx \\ y = \int_{-\pi}^{\pi} f(x)\sin x\, dx \end{cases} \quad \text{[Formula 3]}$$

From the formula 3, the x correlation is calculated as the following formula 4.

$$x = \int_{-\pi}^{\pi} f(x)\cos x\, dx \quad \text{[Formula 4]}$$

$$= \int_{-\frac{\pi}{a}+b}^{\frac{\pi}{a}+b} \{1+\cos a(x-b)\}\cos x\, dx$$

$$= \int_{-\frac{\pi}{a}+b}^{\frac{\pi}{a}+b} \{\cos x + \cos x \cdot \cos a(x-b)\}\, dx$$

$$= \int_{-\frac{\pi}{a}+b}^{\frac{\pi}{a}+b} \left\{\cos x + \frac{1}{2}\cos(ax+x-ab) + \frac{1}{2}\cos(ax-x-ab)\right\} dx$$

$$= \left[\sin x + \frac{1}{2(a+1)}\sin\{(a+1)x-ab\} + \frac{1}{2(a-1)}\sin\{(a-1)x-ab\}\right]_{-\frac{\pi}{a}+b}^{\frac{\pi}{a}+b}$$

$$= \sin\left(\frac{\pi}{a}+b\right) + \frac{1}{2(a+1)}\sin\frac{\pi a+\pi+ab}{a} + \frac{1}{2(a-1)}\sin\frac{\pi a-\pi-ab}{a} - \sin\left(\frac{-\pi}{a}+b\right) - \frac{1}{2(a+1)}\sin\frac{-\pi a-\pi+ab}{a} - \frac{1}{2(a-1)}\sin\frac{-\pi a+\pi-ab}{a}$$

$$= \sin\frac{\pi+ab}{a} - \frac{1}{2(a+1)}\sin\frac{\pi+ab}{a} + \frac{1}{2(a-1)}\sin\frac{\pi+ab}{a} - \sin\frac{-\pi+ab}{a} + \frac{1}{2(a+1)}\sin\frac{-\pi+ab}{a} - \frac{1}{2(a-1)}\sin\frac{-\pi+ab}{a}$$

$$= \frac{a^2}{(a+1)(a-1)}\left(\sin\frac{\pi+ab}{a} - \sin\frac{-\pi+ab}{a}\right)$$

$$= \frac{2a^2}{(a+1)(a-1)}\sin\frac{\pi}{a}\cos b$$

Similarly, from the formula 3, the y correlation is calculated as the following formula 5.

$$y = \int_{-\pi}^{\pi} f(x)\sin x\, dx \quad \text{[Formula 5]}$$

$$= \int_{-\frac{\pi}{a}+b}^{\frac{\pi}{a}+b} \{1+\cos a(x-b)\}\sin x\, dx$$

$$= \int_{-\frac{\pi}{a}+b}^{\frac{\pi}{a}+b} \{\sin x + \sin x \cdot \cos a(x-b)\}\, dx$$

$$= \int_{-\frac{\pi}{a}+b}^{\frac{\pi}{a}+b} \left\{\sin x + \frac{1}{2}\sin(ax+x-ab) - \frac{1}{2}\sin(ax-x-ab)\right\} dx$$

-continued $$= \left[ -\cos x - \frac{1}{2(a+1)} \cos\{(a+1)x - ab\} + \frac{1}{2(a-1)} \cos\{(a-1)x - ab\} \right]_{-\frac{\pi}{a}+b}^{\frac{\pi}{a}+b}$$

$$= -\cos\left(\frac{\pi}{a} + b\right) - \frac{1}{2(a+1)} \cos\frac{\pi a + \pi + ab}{a} +$$

$$\frac{1}{2(a-1)} \cos\frac{\pi a - \pi - ab}{a} + \cos\left(\frac{-\pi}{a} + b\right) +$$

$$\frac{1}{2(a+1)} \cos\frac{-\pi a - \pi + ab}{a} - \frac{1}{2(a-1)}$$

$$\cos\frac{-\pi a + \pi - ab}{a}$$

$$= -\cos\frac{\pi + ab}{a} + \frac{1}{2(a+1)} \cos\frac{\pi + ab}{a} - \frac{1}{2(a-1)}$$

$$\cos\frac{\pi + ab}{a} + \cos\frac{-\pi + ab}{a} - \frac{1}{2(a+1)} \cos\frac{-\pi + ab}{a} +$$

$$\frac{1}{2(a-1)} \cos\frac{-\pi + ab}{a}$$

$$= \frac{a^2}{(a+1)(a-1)} \left( -\cos\frac{\pi + ab}{a} + \cos\frac{-\pi + ab}{a} \right)$$

$$= \frac{2a^2}{(a+1)(a-1)} \sin\frac{\pi}{a} \sin b$$

Here, when vector phases of the x correlation and y correlation are obtained by the formulas 4 and 5, the following formula 6 is obtained, and a value of b can be calculated.

$$\arctan\frac{y}{x} = \arctan\frac{\frac{2a^2}{(a+1)(a-1)} \sin\frac{\pi}{a} \sin b}{\frac{2a^2}{(a+1)(a-1)} \sin\frac{\pi}{a} \cos b}$$ [Formula 6]

$$= \arctan\frac{\sin b}{\cos b}$$

$$= b$$

Incidentally, as evidenced by the formula 6, the invariable a used in the formula 2 has no affect on a value of b. Also, as evidenced by the formula 6, the value of b is determined only by a ratio between the x correlation and y correlation, so that the contrast of the video camera also has no affect on the calculation result. Moreover, since no threshold is required in order to calculate a displacement position, there are no variations in calculation results.

An explanation as to the principle for calculating the value of b (the x coordinate of the gauge line G1) according to the present embodiment was described in the above.

In order to calculate the value of b by the computer 8 in reality, the calculation of the formula 3 can be discretely carried out. Specifically, a correlation Rx of the function f(x) explained in FIG. 3(B) and the cos x is calculated, and a correlation Ry of the function f(x) and the sin x is calculated, so that from a ratio of the above-mentioned calculation results, $\tan^{-1}$ (Ry/Rx) can be obtained.

Figure 4:
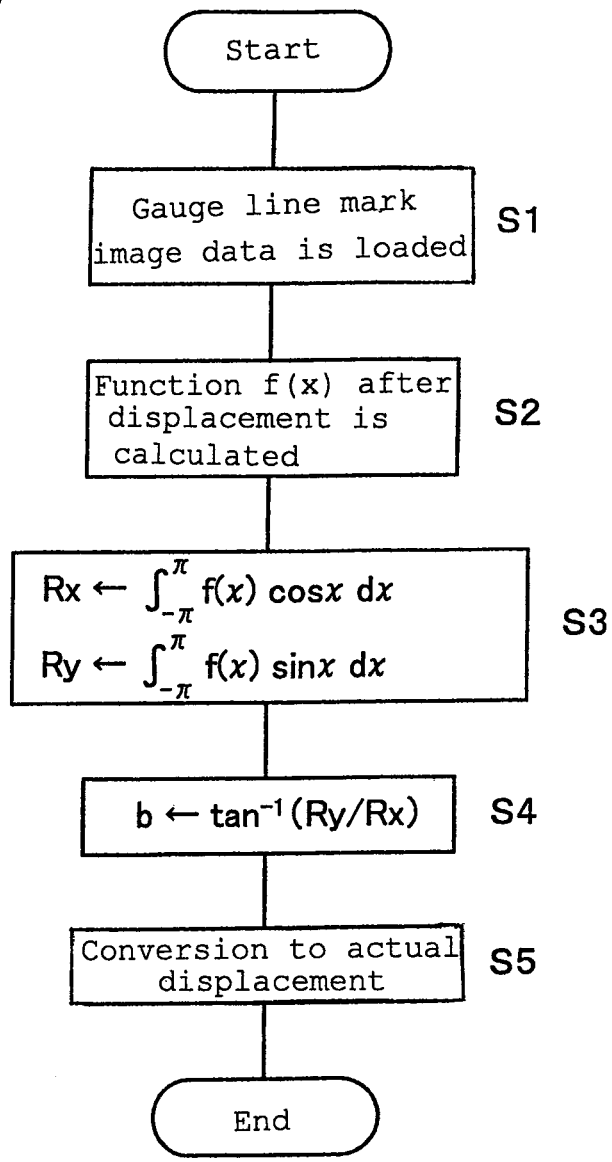
FIG. 4 is a flowchart showing a procedure for determining a gauge line position.

FIG. 4 is a flowchart showing a procedure for determining the gauge line positions. The procedure shown in the drawing is stored in the ROM (or the external memory device 14) of the computer 8 in the form of a program, and carried out by the CPU.

In step S1, the gauge line mark image data are loaded into a work area of the CPU from the video camera 6.

In step S2, as explained in FIGS. 3(A), 3(B), the function f(x) when a load is applied on the test piece TP is calculated.

In step S3, the correlation Rx of the function f(x) obtained in the step S2 and the cos x is calculated. At the same time, the correlation Ry of the above-mentioned function f(x) and the sin x is calculated.

In step S4, $\tan^{-1}$ (Ry/Rx) is calculated from the ratio of the calculation results obtained in the step S3, and the result is determined as b.

In step S5, a conversion process for converting the value of b obtained in the step S4 to an actual length, and a correction process are carried out.

Figure 5:
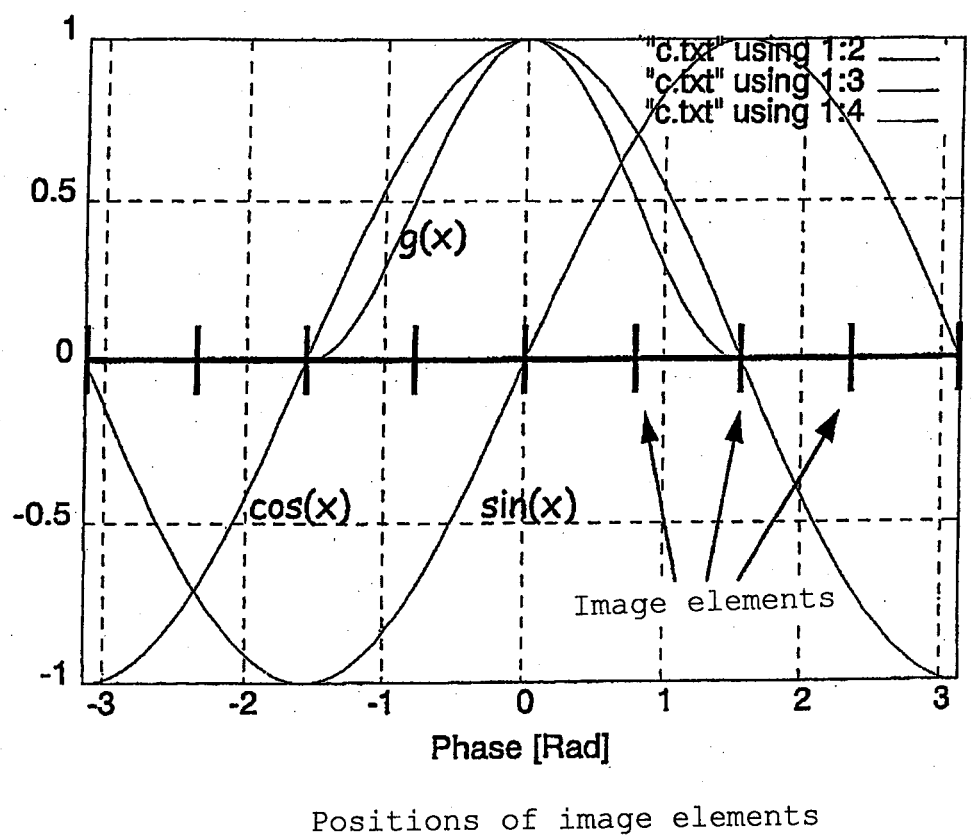
FIG. 5 is a drawing explaining an effect on a measurement result caused by discretely arranged image elements of a video camera 6.

FIG. 5 is a drawing explaining an effect on the measurement result which is caused by discretely arranged image elements of the video camera 6. As shown in FIG. 5, it is assumed that there are nine image elements wherein the X-axis direction is divided into eight in the range of $-\pi$ to $+\pi$. The size of the signal input for calculation is expressed in the following formula 7, and it is assumed that the value of b moves from 0 to $\pi/4$ (=one pixel)

$$g(x) = \begin{cases} \frac{1}{2}\{1 + \cos 2(x-b)\} & \left(\frac{-\pi}{2} + b \leq x \leq \frac{\pi}{2} + b\right) \\ 0 & \left(x < \frac{-\pi}{2} + b, \frac{\pi}{2} + b < x\right) \end{cases}$$ [Formula 7]

Then, the image elements with respect to the calculation of correlation coefficients are only four elements which are located in $-\pi/4, 0, \pi/4, \pi/2$, and the correlation coefficients of x, y are respectively calculated as follows.

First, the x correlation is obtained by the following formula 8.

$$x = \frac{1}{2}\{1 + \cos 2(-\frac{\pi}{4} - b)\} \cdot \cos\left(-\frac{\pi}{4}\right) +$$ [Formula 8]

$$\frac{1}{2}\{1 + \cos 2(0 - b)\} \cdot \cos(0) +$$

$$\frac{1}{2}\{1 + \cos 2(\frac{\pi}{4} - b)\} \cdot \cos\left(\frac{\pi}{4}\right) + \frac{1}{2}\{1 + \cos 2(\frac{\pi}{2} - b)\} \cdot \cos\left(\frac{\pi}{2}\right)$$

Similarly, the y correlation is obtained by the following formula 9.

$$y = \frac{1}{2}\{1 + \cos 2(-\frac{\pi}{4} - b)\} \cdot \sin\left(-\frac{\pi}{4}\right) +$$ [Formula 9]

$$\frac{1}{2}\{1 + \cos 2(0 - b)\} \cdot \sin(0) +$$

$$\frac{1}{2}\{1 + \cos 2(\frac{\pi}{4} - b)\} \cdot \sin\left(\frac{\pi}{4}\right) + \frac{1}{2}\{1 + \cos 2(\frac{\pi}{2} - b)\} \cdot \sin\left(\frac{\pi}{2}\right)$$

Consequently, if β is obtained by using the following formula 10 from the formulas 8, 9, β becomes the function of b.

$$\beta = \arctan\left(\frac{y}{x}\right)$$ [Formula 10]

Figure 6:
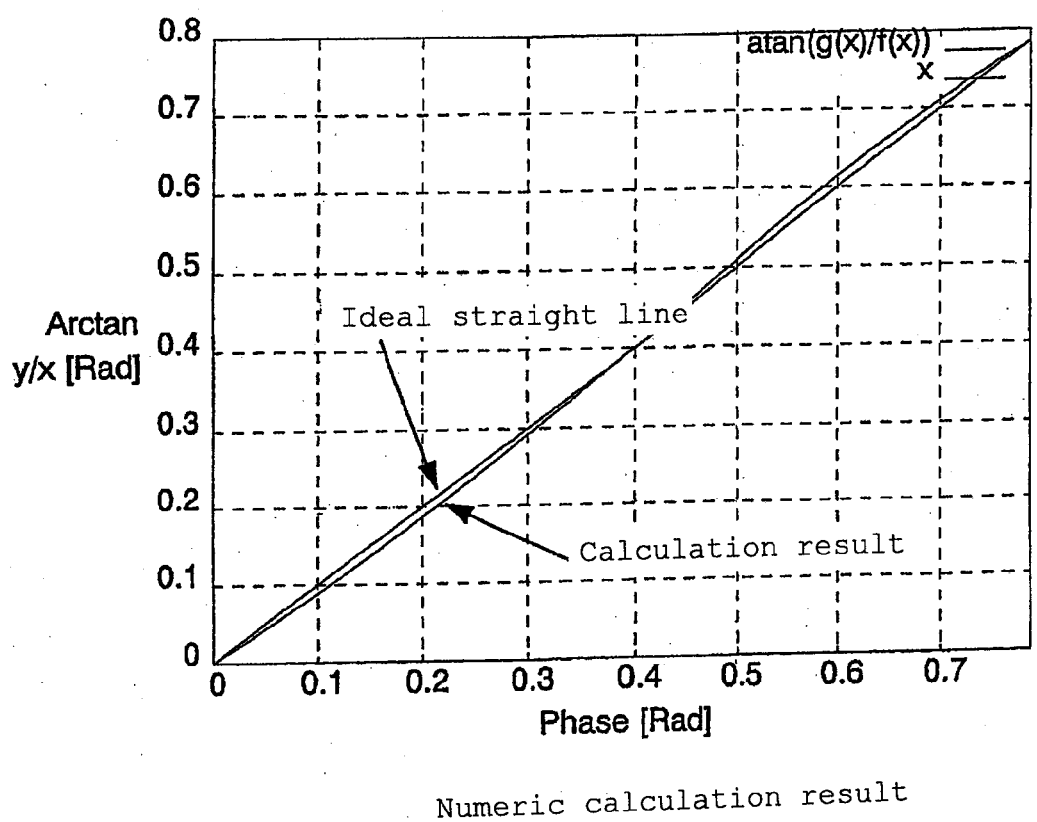
FIG. 6 is a drawing showing a relationship between a calculation result when the image elements of the video camera 6 are discretely arranged, and an ideal straight line.

The relationship between the result of the numeric calculation calculated as above and an ideal straight line is shown in FIG. 6.

Figure 7:
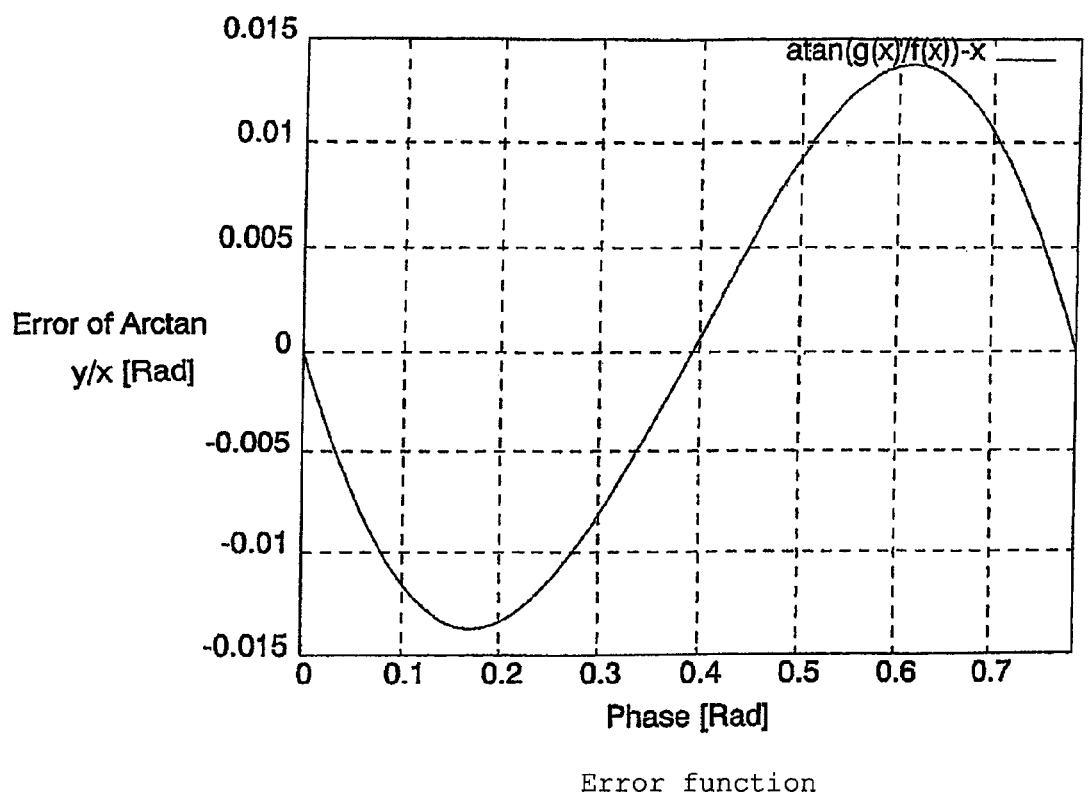
FIG. 7 is a drawing showing an error between the calculation result and the ideal straight line shown in FIG. 6.

FIG. 7 shows an error between the calculation result and the ideal straight line shown in FIG. 6. As is clear from the drawing, although there are only four elements which are related to the calculation, accuracy with approximately 0.2 percents of the calculation area (image range) can be obtained. Therefore, it is clear that the discretely arranged image elements have little effect on the measurement result.

In the embodiment, the gauge line marks M with continuous harmonious distribution (i.e., a gray scale) wherein the black color density goes gradually down on both sides from the axis of symmetry of the gauge lines G on the test piece TP, are used. As a result, even interpolation between the image elements can be carried out compared to a case of using a black-and-white gauge line mark which has been conventionally used, so that a higher resolution can be achieved.

In the embodiment, the continuous harmonious distribution, wherein the black color density goes gradually down on both sides from the axis of symmetry of the gauge lines G on the test piece TP, is taken with the video camera, so that the level of the picture signal which is output through the image elements also becomes continuous. As a result, high measurement accuracy can be stably obtained.

When focused only on one image element, a photosensitive portion exists only in a part of an area with the image element. However, in the conventional well-known black-and-white gauge line mark, an image output does not change until the photosensitive portion of the adjoining element responds after an edge portion passes through, so that an appropriate calculation result could not be obtained. On the other hand, in the embodiment, the continuous harmonious distribution, wherein the black color density goes gradually down, is taken, so that a stable positional calculation can always be carried out.

In the embodiment, a calculation of the gauge line positions can be carried out without depending on setting up a video camera side wherein the gauge line marks M are imaged, and a contrast of the image signal.

When positions of the gauge lines G are calculated, calculations can be carried out without using a predetermined threshold, so that there is no variation caused in the calculation results.

Even if the image elements are discretely arranged, the continuous harmonious black color density is taken as the gauge line marks M, so that the discrete arrangement of the image elements has little influence on the calculation results for measuring the positions.

Each structural element in the first embodiment can be modified as follows.

In the above-mentioned gauge line marks M, the black continuous harmonious distribution is used. However, a chromatic-colored continuous harmonious distribution, which is set in such a way as to be line-symmetric, can be also applied. Also, the color density in the position of the axis of symmetry is not required to be one (100%), and inversely may be zero (0%).

Figure 8:
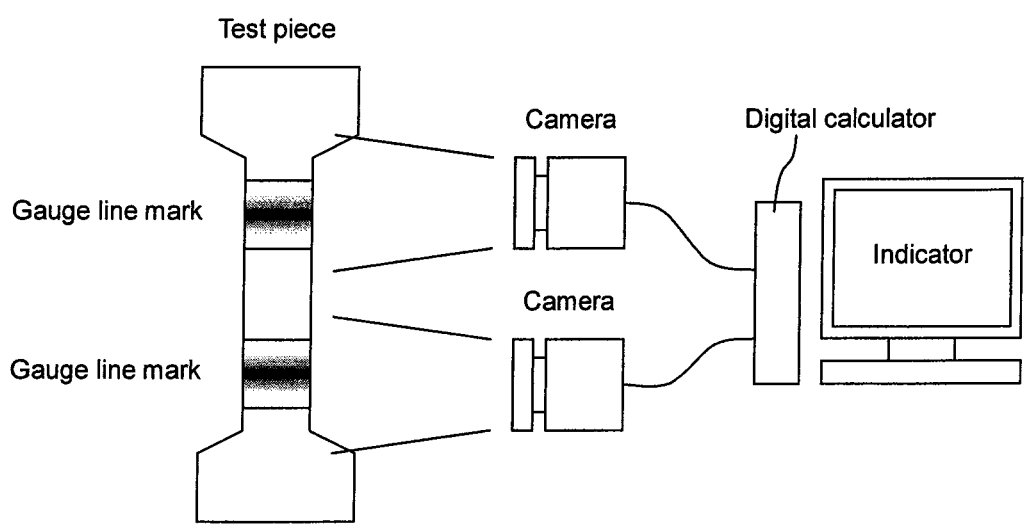
FIG. 8 is an explanatory drawing of the extensometer using two video cameras.

In the structure shown in FIG. 1, two gauge line marks M1, M2 are taken as an image within the visual field by using one video camera 6. However, as shown in FIG. 8, one video camera can be used relative to one gauge line mark. Conversely, more than three gauge line marks can be taken by one video camera, thereby measuring multiple distances between the gauge lines simultaneously.

In the first embodiment, the extensional deformation of the test piece TP is measured. However, both functions of the extensometer and a width meter can be obtained using one gauge line mark. The above-mentioned structure will be explained hereinafter.

An overall structure for functioning as the extensometer and the width meter simultaneously is the same as the structure shown in FIG. 1. However, as an image of the gauge line marks, the line-symmetric density distribution is required to be an image with not only the X-axis direction, but also the Y-axis direction.

In order to measure the extensional deformation in the X-axis direction and the extensional deformation in the Y-axis direction simultaneously, for example, the gauge line marks with shading shown in the following formula 1 can be used.

$$\text{Contrast} = \frac{1}{4}(\cos x + \cos y + 2) \quad (-\pi < x < \pi) \qquad \text{[Formula 11]}$$

Obviously, the formula 11 can be applied to not only an achromatic color but also a chromatic color.

Figure 9:
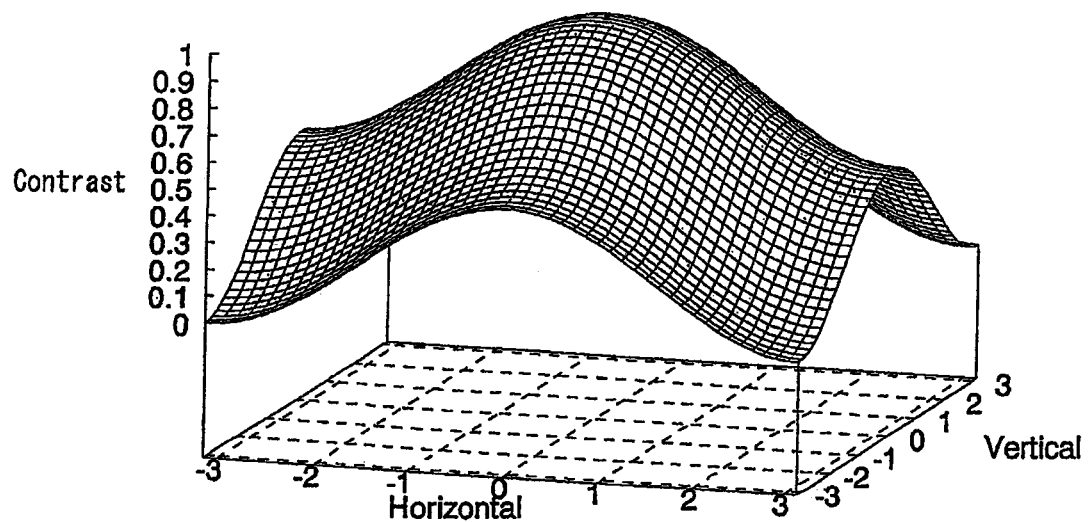
FIG. 9 is an explanatory drawing showing a density distribution for simultaneously measuring an extensional deformation in an X-axis direction and an extensional deformation in a Y-axis direction.

FIG. 9 is an example showing the density distribution for simultaneously measuring the extensional deformation in the X-axis direction and the extensional deformation in the Y-axis direction. Incidentally, in FIG. 9, a variable as a contrast is used. However, this contrast does not mean the usual contrast (brightness difference), but represents the color density in each coordinate position in the range of 1 to 0.

Figure 10:
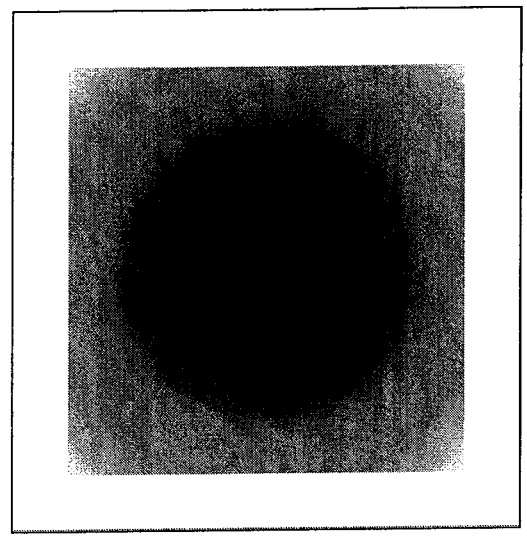
FIG. 10 is a drawing showing an example of the gauge line mark including a continuous harmonious color density distribution for simultaneously measuring the extensional deformation in the X-axis direction and the extensional deformation in the Y-axis direction.

FIG. 10 shows an example of the gauge line marks with the continuous harmonious color density distribution for simultaneously measuring the extensional deformation in the X-axis direction and the extensional deformation in the Y-axis direction.

Second Embodiment

Figure 11:
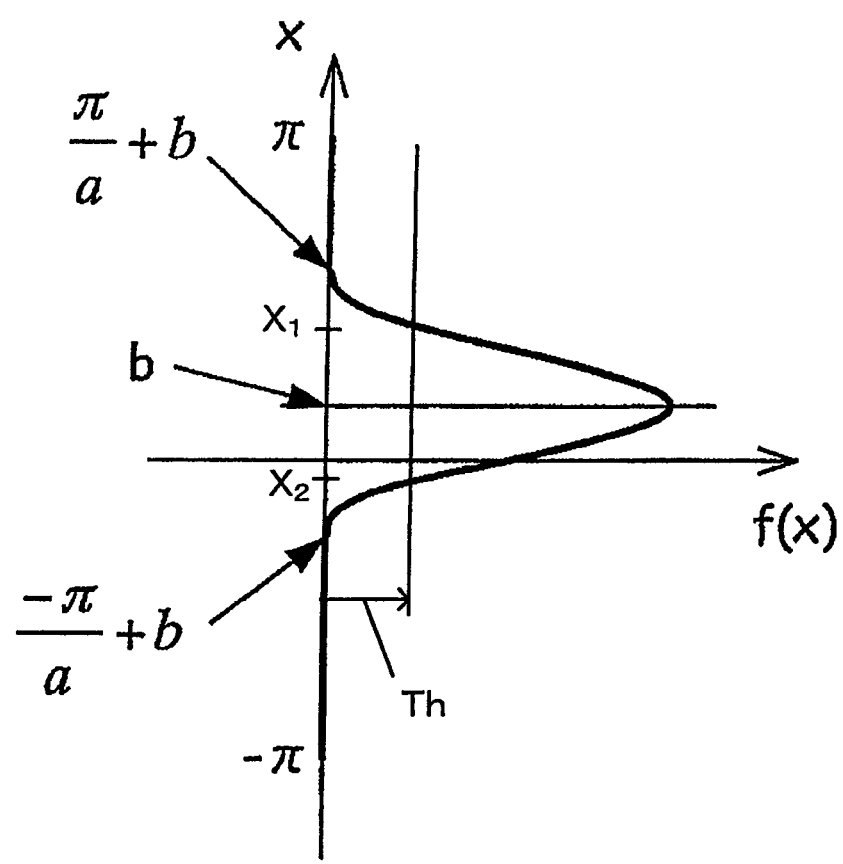
FIG. 11 is an explanatory drawing of a second embodiment.

FIG. 11 is an explanatory drawing showing a procedure for calculating a position (position of the center of gravity of the gauge line marks) b of the gauge lines G by using the function f(x) shown in FIG. 3(B).

Since the procedure for calculating the function f(x) shown in FIG. 3(B) was explained in the first embodiment, the explanation is omitted. In the second embodiment, intersections $X_1$, $X_2$ of a predetermined threshold Th and the function f(x) are obtained, and the midpoint is the coordinate of b.

In the embodiment, a conventional threshold is used, so that after the function f(x) shown in FIG. 3(B) is calculated, positions of the gauge lines can be calculated more easily.

Modified Example

As shown in FIG. 11, important numeric values in the second embodiment are $X_1$, $X_2$ which are the intersections of the threshold Th and the function f(x). Therefore, any density distribution may be used except an initial rising area and falling area including the intersections $X_1$, $X_2$. Specifically, the density around the axis of symmetry of the gauge line marks is not necessarily required to be continuous tone. As an example, the gauge line marks, wherein a predetermined area of the X-axis direction which sandwiches the gauge lines has a certain density, can be used.

Third Embodiment

Figure 12:
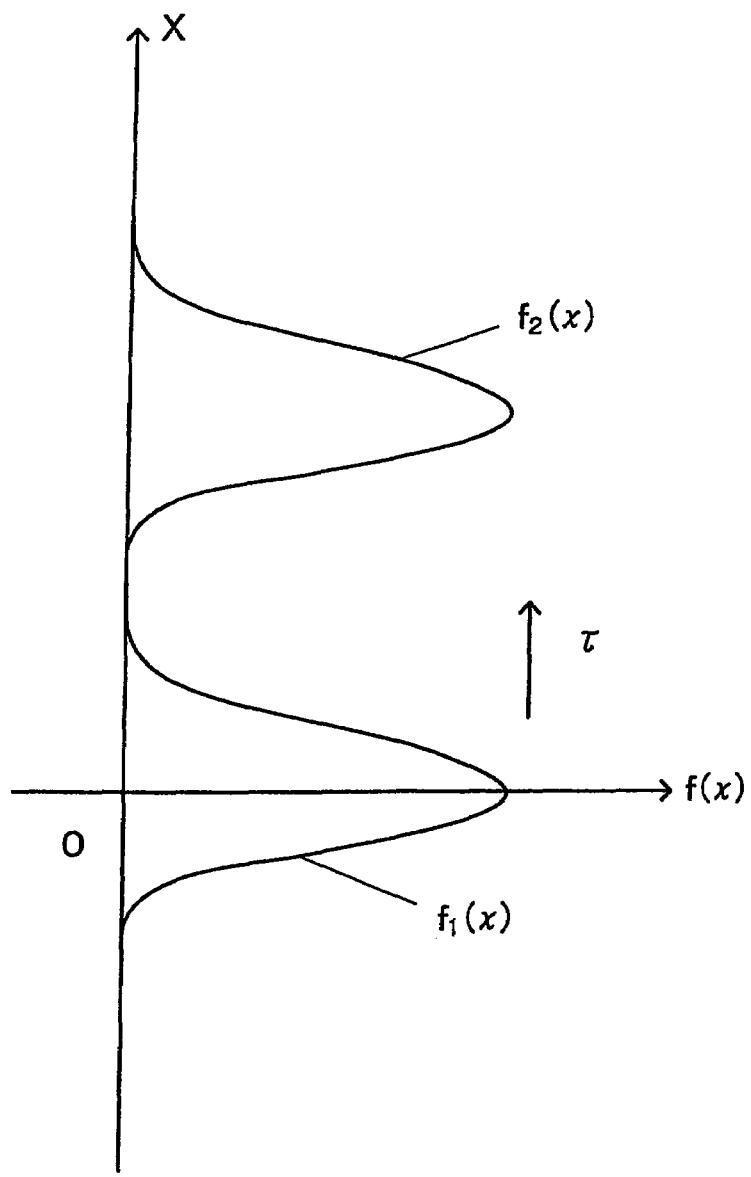
FIG. 12 is an explanatory drawing of a third embodiment.

FIG. 12 is an explanatory drawing showing a procedure calculating the position (position of the center of gravity of the gauge line marks) b of the gauge lines G by using the function f(x) shown in FIG. 3(B).

Since the procedure for calculating the function f(x) shown in FIG. 3(B) was explained in the first embodiment, the explanation is omitted. In the third embodiment, a function $f_1(x)$ is preliminarily obtained by integrating the shading distribution of the gauge line marks M in a crosswise direction before the load is applied on the test piece TP. Next, the function $f_1(x)$ is transferred $\Delta\tau$ by $\Delta\tau$ on the X-axis until the function $f_1(x)$ corresponds to a function $f_2(x)$ after the displacement. The reference symbol $\Delta\tau$ represents a desired resolution. Herewith, the position b of the center of gravity of the gauge line marks M can be obtained. In order to transfer the function $f_1(x)$ on the X-axis, a correlation between $f_1(x-\tau)$ and $f_2(x)$ can be calculated. The reference symbol $\tau$ showing the maximum correlation value is the coordinate of b.

According to the embodiment, since the function $f_1(x)$ can be preliminarily obtained by integrating the shading distribution of the gauge line marks M in a crosswise direction, for a user using the same gauge line marks M, a well-known function $f_1(x)$ can be employed.

Modified Examples

In the third embodiment, the positions of the gauge lines are determined as follows. (1) The first function $f_1(x)$ wherein the X-coordinate is the variable is preliminarily calculated by integrating the gauge line mark image data in the Y-axis direction parallel to the gauge lines G before the load is applied on the X-axis direction orthogonal to the gauge lines G of the test piece TP; (2) the second function $f_2(x)$ wherein the X-coordinate is the variable is calculated by integrating the gauge line mark image data in the Y-axis direction at the point wherein the gauge line marks M are displaced in the X-axis direction accompanied by positional displacements of the gauge lines G when the load is applied on the test piece TP; and (3) the reference symbol $\tau$ wherein a correlation function $R_{12}(\tau)$ relative to the first function $f_1(x)$ and the second function $f_2(x)$ shows the maximum value is obtained.

However, the function to transfer the positions of the gauge lines on the X-axis is not limited to the first function $f_1(x)$, and an arbitrary function such as a normal distribution curve, an isosceles triangle, or the like can be used.

The above-mentioned explanation is only one example, and the present invention is not limited to the embodiments and the modified examples described hereinabove, and can be modified provided that they do not exceed the feature of the present invention. Also, other embodiments conceivable within the scope of a technical idea of the present invention are included in the scope of the present invention.

Correspondence relationships between the structural elements described in the aspects and the embodiments are as follows.

The test piece corresponds to the test piece TP in FIG. 1. The gauge lines correspond to the gauge lines G1, G2 in FIG. 1. The gauge line marks, wherein the continuous harmonious color density is distributed in such a way as to be symmetrical with respect to the gauge lines, correspond to the gauge line marks M1, M2. The video camera corresponds to the video camera 6 in FIG. 1. The calculation means corresponds to the computer 8 in FIG. 1.

Incidentally, the above-mentioned relationships do not limit the nature of the present invention.

The disclosure of Japanese Patent Application No. 2008-059462, filed on Mar. 10, 2008, is incorporated in the application.

While the invention has been explained with reference to the specific embodiments of the invention, the explanation is illustrative and the invention is limited only by the appended claims.

What is claimed is:

1. A gauge line position measuring device for measuring a position of a gauge line provided on a test piece by a non-contact video method, comprising:
   a gauge line mark adapted to be provided on the test piece and having said gauge line and a first continuous harmonious color density arranged line-symmetrically with respect to the gauge line;
   a video camera for taking an image of the gauge line mark on the test piece and outputting gauge line mark image data; and
   a calculation device for calculating a gauge line position based on the gauge line mark image data,
   wherein the gauge line mark is a gauge line sticker on which the gauge line mark is printed; and said first continuous harmonious color density is an achromatic or chromatic colored continuous harmonious distribution gradually changed in a direction away from the gauge line and arranged line-symmetrically with respect to the gauge line;
   wherein the calculation device preliminarily calculates a first function $f_1(x)$ wherein the X-coordinate is a variable as reference data by integrating the gauge line mark image data in a Y-axis direction parallel to the gauge line before a load is applied on an X-axis direction orthogonal to the gauge line; calculates a second function $f_2(x)$ where the X-coordinate is the variable by integrating the gauge line mark image data in the Y-axis direction when the gauge line marks are displaced in the X-axis direction by a positional displacement of the gauge line due to the load; and obtains a reference symbol T where a correlation function $R_{12}(T)$ relative to the first function $f_1(x)$ and the second function $f_2(x)$ has a maximum value, thereby determining the gauge line position.

2. A gauge line position measuring device according to claim 1, wherein the gauge line mark further includes a second continuous harmonious color density line-symmetrical to a line orthogonal to the gauge line and passing through a predetermined point on the gauge line; and when the load is applied on the test piece, the gauge line is displaced toward an X-axis direction orthogonal to the gauge line and a Y-axis direction parallel to the gauge line, and the calculation device calculates a X-coordinate and a Y-coordinate of the test piece by using the gauge line mark having the second continuous harmonious color density.

3. A gauge line position measuring device according to claim 1, wherein in the first continuous harmonious color density, the gauge line has a black color, and a density of the black color is gradually changed in the direction away from the gauge line without a space.

4. A gauge line position measuring device according to claim 3, wherein an area exceeding $\pm\pi$ from the gauge line has a white color.

5. A gauge line position measuring device according to claim 1, wherein the first continuous harmonious color density is arranged symmetrically with respect to the gauge line and a line orthogonal to the gauge line, and the first continuous harmonious color density is gradually changed in a direction away from a position where the first gauge line intersects with the line orthogonal to the gauge line.

* * * * *